(12) United States Patent
Chin et al.

(10) Patent No.: US 8,451,819 B2
(45) Date of Patent: May 28, 2013

(54) METHODS AND APPARATUS FOR UPLINK FRAME SYNCHRONIZATION IN A SUBSCRIBER STATION

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1095 days.

(21) Appl. No.: 12/056,206

(22) Filed: Mar. 26, 2008

(65) Prior Publication Data

US 2009/0245227 A1    Oct. 1, 2009

(51) Int. Cl.
*H04J 3/06* (2006.01)
*H04W 56/00* (2009.01)

(52) U.S. Cl.
CPC ..................................... *H04W 56/00* (2013.01)
USPC .......................................... 370/350; 370/448

(58) Field of Classification Search
CPC ....................................................... H04W 56/00
USPC .......................................................... 370/350
See application file for complete search history.

(56) References Cited

U.S. PATENT DOCUMENTS

| | | | |
|---|---|---|---|
| 6,493,539 B1 * | 12/2002 | Falco et al. ................ | 455/67.11 |
| 7,151,944 B2 * | 12/2006 | Hashem et al. ............. | 455/502 |
| 2006/0029031 A1 * | 2/2006 | Koorapaty ................... | 370/350 |
| 2007/0140127 A1 | 6/2007 | Frei | |
| 2008/0008156 A1 * | 1/2008 | Kuehner ...................... | 370/350 |
| 2009/0124266 A1 * | 5/2009 | Carlson et al. .............. | 455/456.5 |
| 2010/0113054 A1 * | 5/2010 | Iwamura et al. ............ | 455/452.1 |
| 2010/0278871 A1 * | 11/2010 | Wu et al. ..................... | 424/277.1 |

FOREIGN PATENT DOCUMENTS

| | | |
|---|---|---|
| CN | 101036322 A | 9/2007 |
| EP | 1909409 | 4/2008 |
| GB | 2290926 | 1/1996 |
| JP | 10242937 A | 9/1998 |
| JP | 2001358638 A | 12/2001 |
| JP | 2007295619 A | 11/2007 |
| RU | 2195076 | 12/2002 |
| RU | 2225675 C2 | 3/2004 |
| WO | WO9820627 A2 | 5/1998 |
| WO | WO9857450 A1 | 12/1998 |

OTHER PUBLICATIONS

International Search Report and the Written Opinion—PCT/US2009/035936, International Search Authority—European Patent Office—Jun. 2, 2009.
Siemens: "Considerations on E-UTRA Uplink Time Synchronization," 3GPP TSG-RAN WG1 #47bis; [Jan. 19, 2007], 3GPP Draft R1-070308, 3RD Generation Partnership Project (3GPP), Antipolis Cedex, France , XP050104343 paragraph [003.]; figure 1.

* cited by examiner

*Primary Examiner* — Brandon Renner
*Assistant Examiner* — Shaq Taha
(74) *Attorney, Agent, or Firm* — Charles Chesney (57) ABSTRACT

A method for uplink frame synchronization in a subscriber station may include recording a first time stamp corresponding to a first downlink frame and recording a second time stamp corresponding to a second downlink frame. The first time stamp and the second time stamp may be used to determine a propagation delay change. Uplink transmission timing may be adjusted based on the propagation delay change that is determined.

35 Claims, 7 Drawing Sheets

METHODS AND APPARATUS FOR UPLINK FRAME SYNCHRONIZATION IN A SUBSCRIBER STATION

TECHNICAL FIELD

The present disclosure relates generally to wireless communication systems. More specifically, the present disclosure relates to methods and apparatus for uplink frame synchronization in a subscriber station.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a subscriber station, a mobile station, an access terminal, a remote station, a user terminal, a terminal, a subscriber unit, user equipment, etc. The term "subscriber station" will be used herein.

A wireless communication system may provide communication for a number of cells, each of which may be serviced by a base station. A base station may be a fixed station that communicates with subscriber stations. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

DETAILED DESCRIPTION

A base station may support wireless communications for multiple subscriber stations. The subscriber stations may be located at different distances from the base station. In other words, some subscriber stations may be located relatively close to the base station, while other subscriber stations may be located relatively far away from the base station.

As used herein, the "propagation delay" is the amount of time that it takes for an uplink transmission from a subscriber station to reach a base station. The propagation delay may be related to the distance between the subscriber station and the base station. In other words, the propagation delay for a subscriber station that is far away from the base station may be greater than the propagation delay for a subscriber station that is relatively close to the base station.

As used herein, a "frame" is a time interval of constant length. A frame may include a fixed set of periodically repeated time slots of fixed length. The different time slots within a frame may correspond to different channels.

In certain wireless communication systems, communications between the subscriber stations and the base station may be synchronized so that, at least ideally, uplink transmissions from different subscriber stations corresponding to the same uplink frame are received at the same time by the base station. This implies that a subscriber station that is located relatively far away from the base station may start to transmit the uplink frame earlier than a subscriber station that is located relatively close to the base station.

A subscriber station may be mobile, i.e., the position of the subscriber station may change. As a result, the distance between the subscriber station and the base station may change. When the position of a subscriber station changes relative to a base station, this changes the amount of time that it may take for uplink transmissions to travel from the subscriber station to the base station. If the subscriber station moves closer to the base station, the amount of time that it may take for uplink transmissions to reach the base station may decrease. If the subscriber station moves farther away from the base station, the amount of time that it may take for uplink transmissions to reach the base station may increase.

Ranging methods have been utilized so that subscriber stations know the correct time to transmit the uplink frame in order to maintain proper synchronization. In accordance with these ranging methods, the base station may measure the timing of the data that is received on the uplink from a particular subscriber station, decide the appropriate timing adjustment (if any), and send the adjustment to the subscriber station in a ranging response message. Ranging may be performed during the initial contact between a subscriber station with a base station. Ranging may also be performed on periodic basis thereafter, to correct for any change in the position of the subscriber station that may have occurred. However, the use of periodic ranging may cause a significant amount of message overhead between the subscriber station and the base station. In addition, periodic ranging may cause a significant amount of processing at the base station.

The present disclosure relates to techniques for allowing subscriber stations to perform uplink frame synchronization. The techniques described herein may be independent of periodic ranging, i.e., it is not necessary that periodic ranging be performed for the techniques described herein to be utilized. In fact, the techniques described herein may even be a substitute for periodic ranging under some circumstances. The techniques described herein may facilitate the synchronization of the uplink transmissions from subscriber stations to a base station even when the positions of some or all of these subscriber stations change relative to the base station.

In accordance with a method for uplink frame synchronization disclosed herein, a subscriber station may record a first time stamp corresponding to a first downlink frame and a second time stamp corresponding to a second downlink frame. The subscriber station may use the first time stamp and the second time stamp to determine a propagation delay change. The subscriber station may adjust uplink transmission timing based on the propagation delay change.

A subscriber station that performs uplink frame synchronization may include a downlink timing monitor that records a first time stamp corresponding to a first downlink frame and a second time stamp corresponding to a second downlink frame. The subscriber station may also include a timing change calculator that uses the first time stamp and the second time stamp to determine a propagation delay change. The subscriber station may also include an uplink frame synchronizer that adjusts uplink transmission timing based on the propagation delay change.

A subscriber station that performs uplink frame synchronization may include means for recording a first time stamp corresponding to a first downlink frame and means for recording a second time stamp corresponding to a second downlink frame. The subscriber station may also include means for adjusting uplink transmission timing based on the propagation delay change.

A computer-program product for uplink frame synchronization may include a computer readable medium having instructions thereon. The instructions may include code for recording a first time stamp corresponding to a first downlink frame and code for recording a second time stamp corresponding to a second downlink frame. The instructions may also include code for using the first time stamp and the second time stamp to determine a propagation delay change. The instructions may also include code for adjusting uplink transmission timing based on the propagation delay change.

The methods and apparatus of the present disclosure may be utilized in a broadband wireless communication system. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Some of the examples described herein are relevant to wireless communication systems that are configured in accordance with WiMAX standards. However, these examples should not be interpreted as limiting the scope of the present disclosure.

The methods and apparatus of the present disclosure may be utilized in wireless communication systems that are based on OFDM (orthogonal frequency division multiplexing) and OFDMA (orthogonal frequency division multiple access) technology. For example, mobile WiMAX is based on OFDM and OFDMA technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique based on OFDM. With OFDMA, users may be assigned sub-carriers in different time slots. OFDMA is a flexible multiple-access technique that can accommodate many users with widely varying applications, data rates, and quality of service requirements.

The methods and apparatus of the present disclosure may be utilized in wireless communication systems that use time division duplexing (TDD). TDD is the application of time-division multiplexing to separate outward and return signals. TDD emulates full duplex communication over a half duplex communication link. Mobile WiMAX supports TDD.

Figure 1:
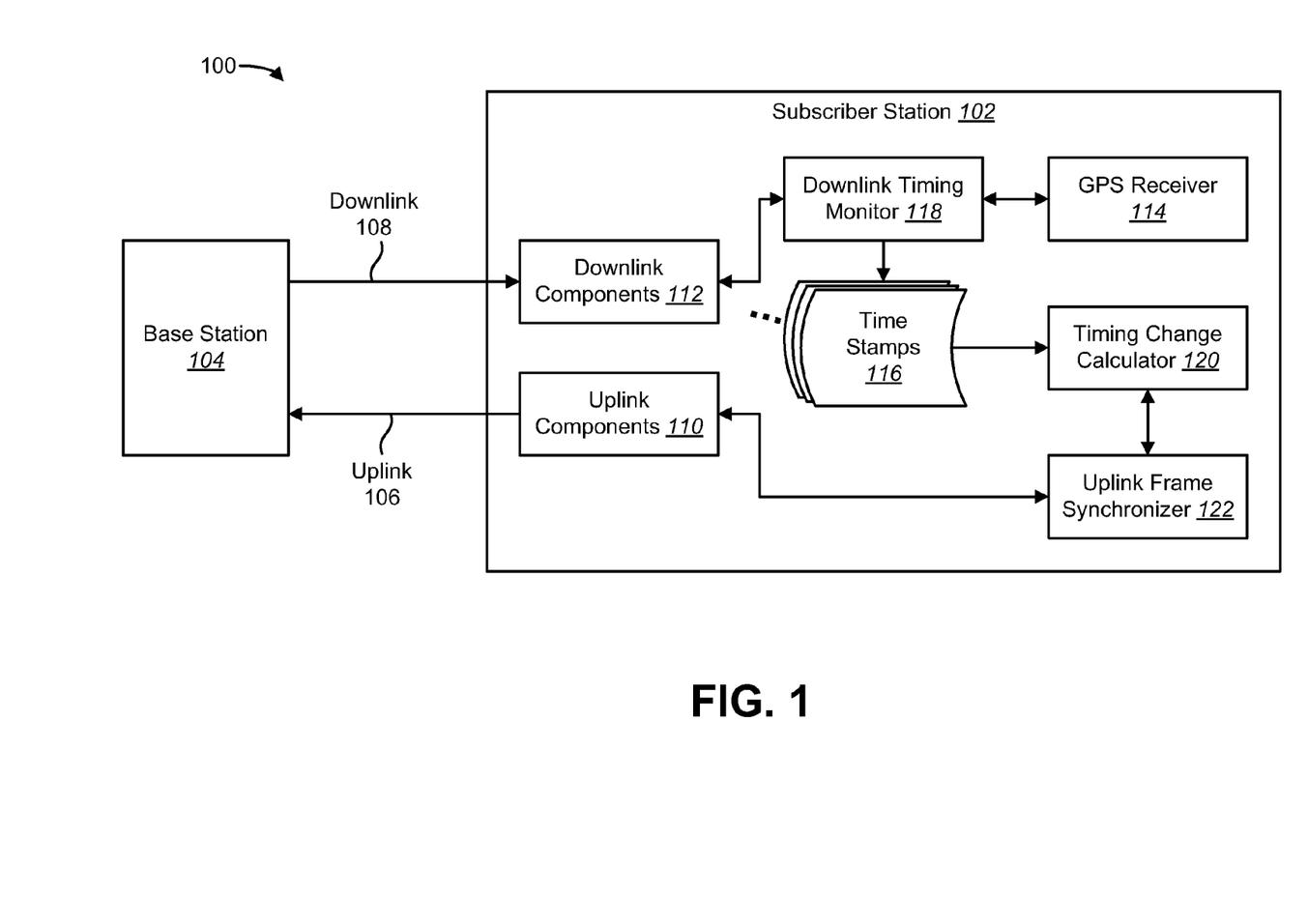
FIG. 1 illustrates a subscriber station that may implement uplink frame synchronization in accordance with the present disclosure.

FIG. 1 illustrates a subscriber station 102 that may implement uplink frame synchronization in accordance with the present disclosure. The subscriber station 102 may be in wireless electronic communication with a base station 104.

Communication from the subscriber station 102 to the base station 104 may occur via an uplink 106. Communication from the base station 104 to the subscriber station 102 may occur via a downlink 108.

Various uplink components 110 at the subscriber station 102 may facilitate communication on the uplink 106. Similarly, various downlink components 112 at the subscriber station 102 may facilitate communication on the downlink 108.

The subscriber station 102 and the base station 104 may be part of a wireless communication system 100 that utilizes orthogonal frequency division multiple access (OFMDA) time division duplexing (TDD), such as mobile WiMAX. In OFDMA TDD systems a "frame" may refer to a time interval of constant length. A frame in which communication occurs on the uplink 106 may be referred to herein as an uplink frame. A frame in which communication occurs on the downlink 108 may be referred to herein as an downlink frame.

The subscriber station 102 may include a global positioning system (GPS) receiver 114. The GPS receiver 114 may be capable of determining its location, speed, and direction. In addition, the GPS receiver 114 may also be capable of providing a highly accurate time stamp 116. Time stamps 116 provided by the GPS receiver 114 may be used for purposes of uplink frame synchronization.

The subscriber station 102 may also include a downlink timing monitor 118. The downlink timing monitor 118 may monitor the communications on the downlink 108 in order to determine the starting point of the downlink frames. Whenever data is received on the downlink 108, the downlink timing monitor 118 may record the time stamp 116 corresponding to the start of the downlink frame. The time stamp 116 may be provided by the GPS receiver 114.

As indicated above, the "propagation delay" refers to the amount of time that it takes for an uplink transmission from the subscriber station 102 to reach the base station 104. By determining how the propagation delay has changed, it may be determined how the timing of transmissions on the uplink 106 should be changed, if at all, in order to maintain proper synchronization with the base station 104.

For example, if the subscriber station 102 moves closer to the base station 104, then the propagation delay may decrease. Thus, to maintain proper synchronization, the next uplink frame may be delayed by an amount corresponding to the change in the propagation delay. Conversely, if the subscriber station 102 moves farther away from the base station 104, then the propagation delay may increase. Thus, to maintain proper synchronization, the next uplink frame may be started earlier by an amount corresponding to the change in the propagation delay.

A timing change calculator 120 may use the time stamps 116 to determine how the propagation delay has changed. Ideally, if the subscriber station 102 does not move during the period of time between two time stamps 116, then the difference between the two time stamps 116 is a multiple of the frame duration. If the subscriber station 102 moves closer to the base station 104, then the difference between the two time stamps 116 is less than a multiple of the frame duration. If the subscriber station 102 moves farther away from the base station 104, then the difference between the two time stamps 116 is greater than a multiple of the frame duration.

The propagation delay change $\Delta$ may be calculated in accordance with equation (1):

$$\Delta = T - n*D \quad (1)$$

where $\Delta$ is the propagation delay change, T is the difference between two time stamps 116 corresponding to the start of two different downlink frames, n indicates the number of frames that occurred between the two time stamps 116, and D is the duration of a single frame.

An uplink frame synchronizer 122 may adjust the uplink transmission timing based on the propagation delay change that is determined. For example, if it is determined that the propagation delay has decreased by $\Delta$ (i.e., that the subscriber station 102 has moved closer to the base station 104 by $\Delta$), then the transmission of the next uplink frame may be delayed by $\Delta$. Conversely, if it is determined that the propagation delay has increased by $\Delta$ (i.e., that the subscriber station 102 has moved farther away from the base station 104 by $\Delta$), then the transmission of the next uplink frame may be started earlier by $\Delta$.

Although a GPS receiver 114 is capable of providing a highly accurate time stamp, there may be some errors associated with the time stamps 116 that are determined. In order to smooth out such errors, the propagation delay change may be averaged for a few consecutive frames before any timing adjustment is applied to the uplink transmission.

Although the subscriber station 102 shown in FIG. 1 includes a GPS receiver 114, it is not necessary that a GPS receiver 114 be used to implement the techniques described herein. Any time stamp generator that is capable of providing an accurate time stamp may be used. The GPS receiver 114 is an example of a time stamp generator. However, other time stamp generators may be used. Some subscriber stations may be capable of providing highly accurate time stamps without the use of a GPS receiver 114.

Figure 2:
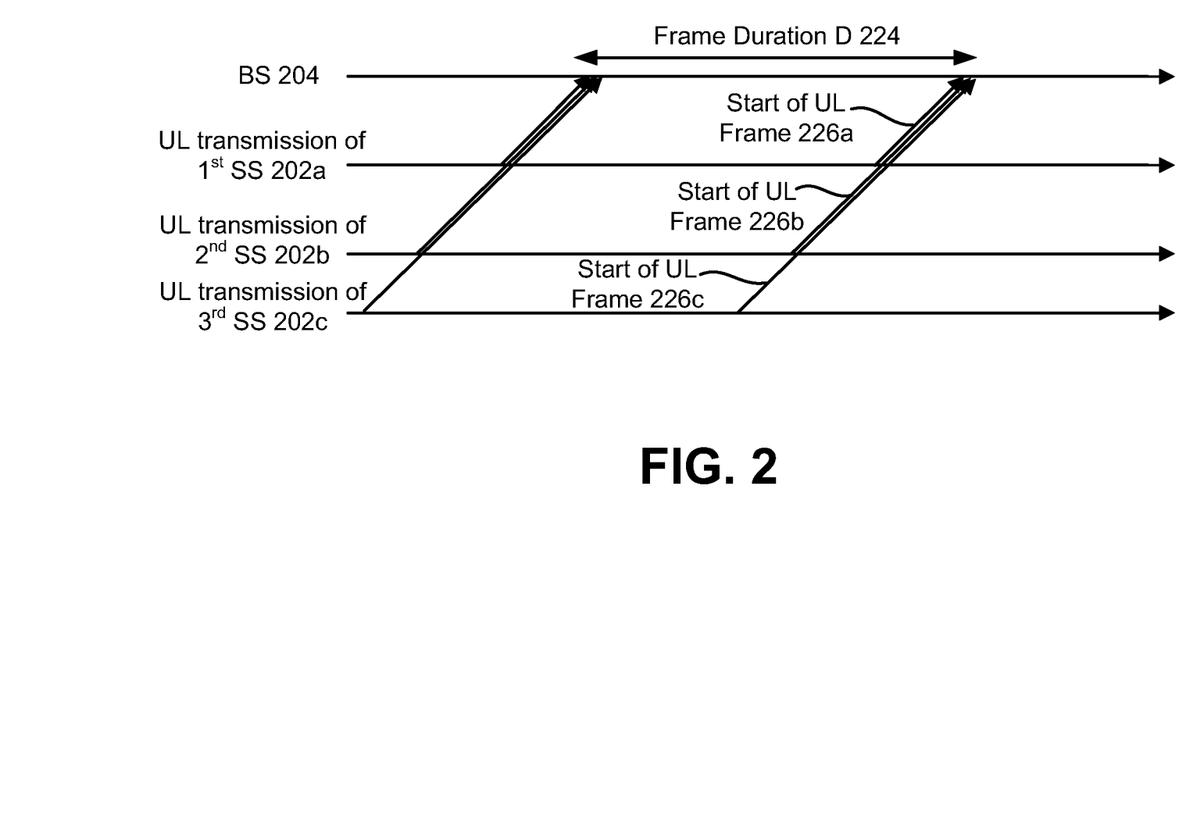
FIG. 2 illustrates an example showing how multiple subscriber stations may start uplink frame transmission at different times in order to maintain synchronization with a base station.

FIG. 2 illustrates an example showing how multiple subscriber stations 202a-c may start uplink frame transmission at different times in order to maintain synchronization with a base station 204. A first subscriber station 202a, a second subscriber station 202b, and a third subscriber station 202c are shown in FIG. 2.

In this example, the first subscriber station 202a is positioned closest to the base station 204, and the third subscriber station 202c is positioned farthest away from the base station 204. The second subscriber station 202b is positioned farther away from the base station 204 than the first subscriber station 202a, but closer to the base station 204 than the third subscriber station 202c.

A frame duration 224 is also shown in FIG. 2. This frame duration 224 is from the perspective of the base station 204.

It may be desired that the uplink transmissions from all three subscriber stations 202a-c reach the base station 204 at about the same time. To achieve this goal, the third subscriber station 202c may begin transmitting the uplink frame 226c first, because it is the farthest away from the base station 204. Then, the second subscriber station 202b may begin transmitting the uplink frame 226b next. The first subscriber station 202a may then begin transmitting the uplink frame 226a. If the uplink timing is synchronized properly, then the uplink transmissions from all three subscriber stations 202a-c reach the base station 204 at the same time.

Figure 3:
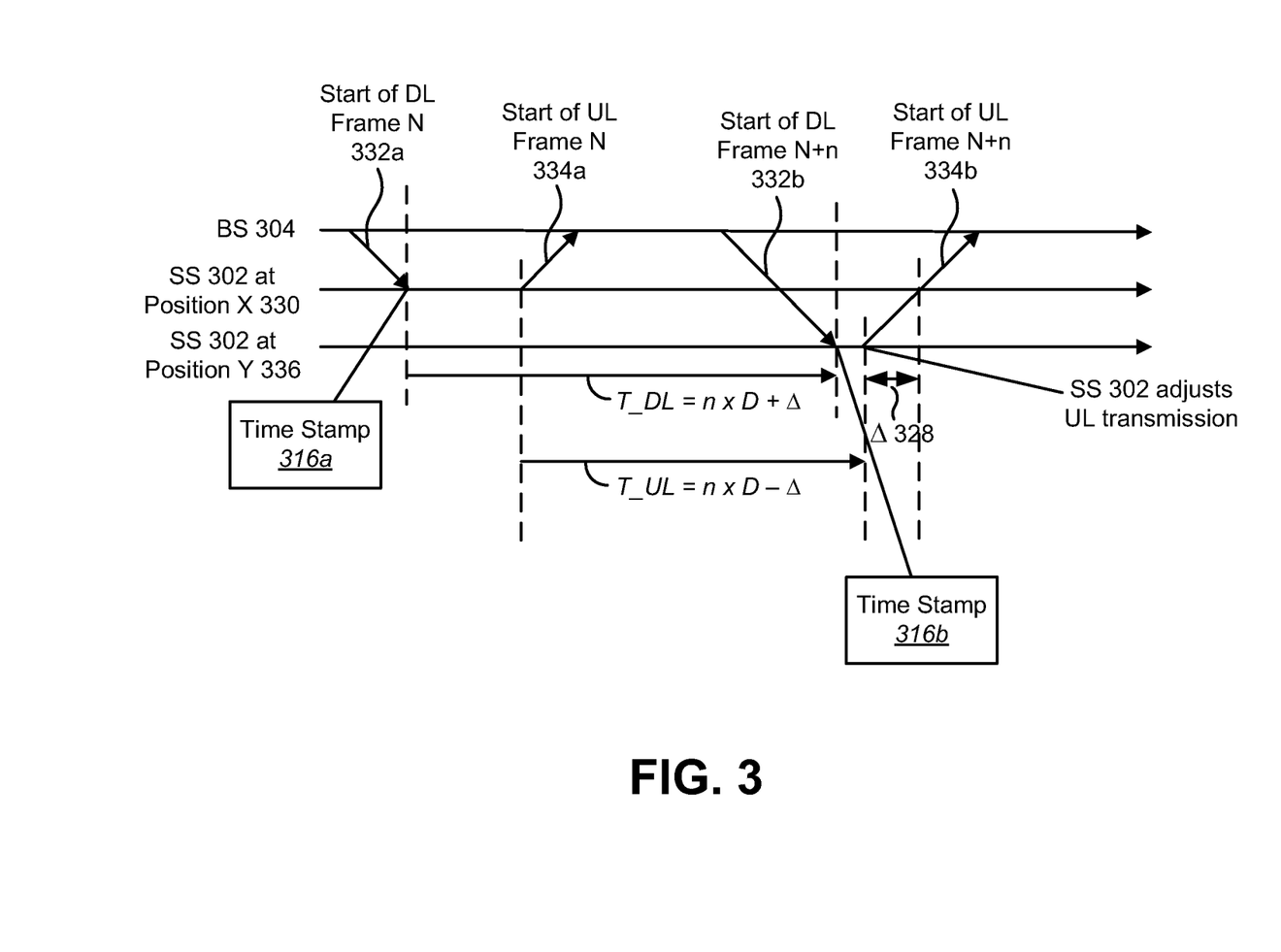
FIG. 3 illustrates an example showing how the propagation delay change for a subscriber station may be determined when the subscriber station moves farther away from the base station.

FIG. 3 illustrates an example showing how the propagation delay change 328 for a subscriber station 302 may be determined when the subscriber station 302 moves farther away from the base station 304. FIG. 3 also illustrates how the uplink transmission timing may be adjusted to compensate for the propagation delay change 328.

In this example, the subscriber station 302 initially begins at position X 330. The subscriber station 302 is shown receiving the start of downlink frame N 332a. The subscriber station 302 may record a time stamp 316a corresponding to the point in time when it received the start of downlink frame N 332a. After downlink frame N 332a has been received, the subscriber station 302 may transmit uplink frame N 334a. The start of uplink frame N 334a is shown in FIG. 3.

The subscriber station 302 may then move from position X 330 to position Y 336, which is farther away from the base station 304 than position X 330. The subscriber station 302 is shown receiving the start of downlink frame N+n 332b, where n is any positive integer. The subscriber station 302 may record a time stamp 316b corresponding to the point in time when it received the start of downlink frame N+n 332b.

The subscriber station 302 may then determine the propagation delay change 328. The time stamps 316a-b may be used to determine the propagation delay change 328. The difference between the time stamps 316a-b is given by n×D+$\Delta$, where $\Delta$ is the propagation delay change 328 and D is the frame duration 224. Equation (1) above may be used to determine the propagation delay change 328.

The subscriber station 302 may adjust the uplink transmission timing based on the propagation delay change 328 that is determined. Because in this example the subscriber station 302 has moved farther away from the base station 304, the propagation delay change 328 has increased (i.e., $\Delta$ is positive). Thus, the transmission of the next uplink frame may be started earlier by $\Delta$, as shown. Therefore, the difference between the start of uplink frame N+n 334b and the start of uplink frame N 334a is given by n×D−$\Delta$, as shown.

Figure 4:
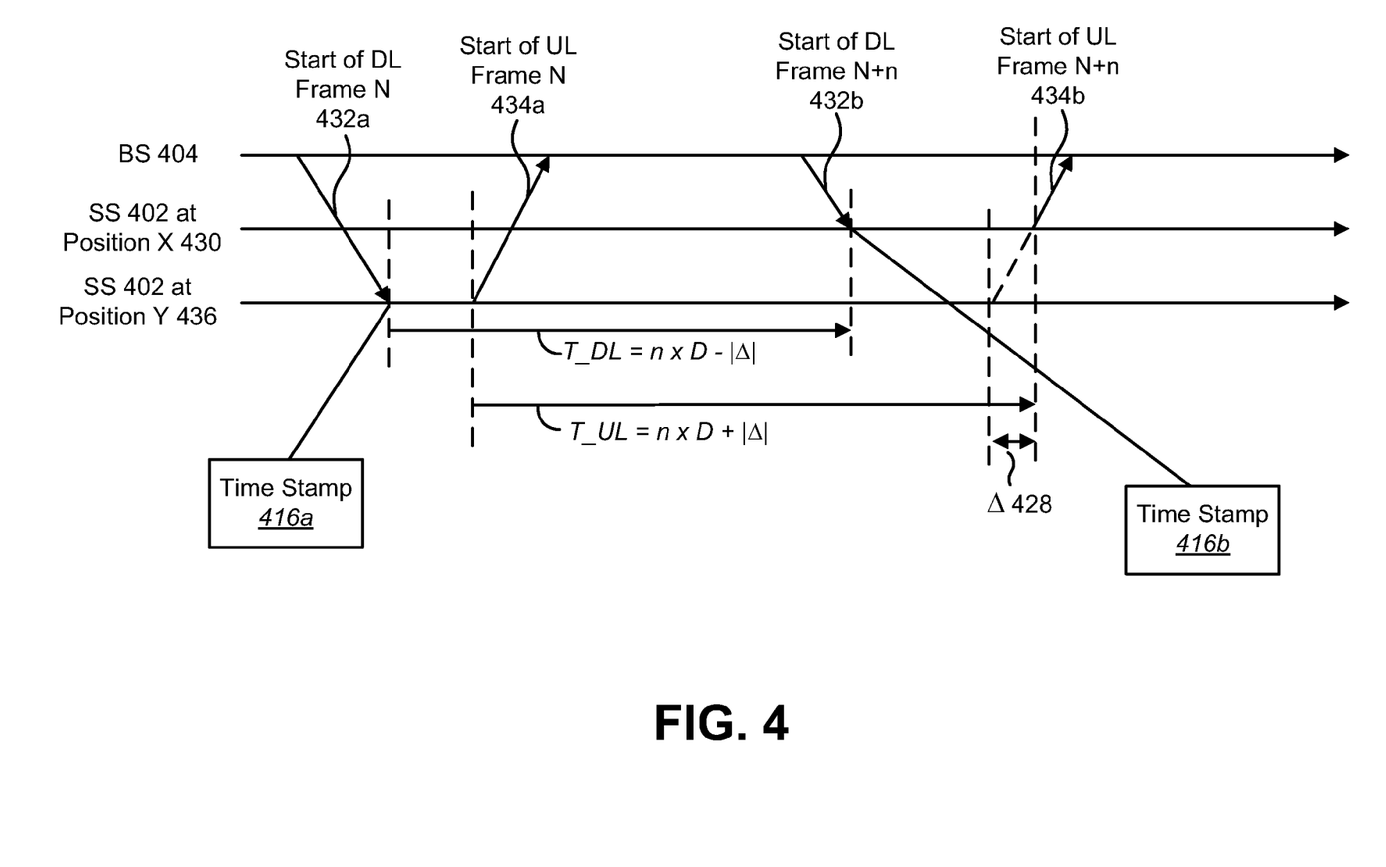
FIG. 4 illustrates another example showing how the propagation delay change for a subscriber station may be determined when the subscriber station moves closer to the base station.

FIG. 4 illustrates an example showing how the propagation delay change 428 for a subscriber station 402 may be determined when the subscriber station 402 moves closer to the base station 404. FIG. 4 also illustrates how the uplink transmission timing may be adjusted to compensate for the propagation delay change 428.

In this example, the subscriber station 402 initially begins at position Y 436. The subscriber station 402 is shown receiving the start of downlink frame N 432a. The subscriber station 402 may record a time stamp 416a corresponding to the point in time when it received the start of downlink frame N 432a. After downlink frame N 432a has been received, the subscriber station 402 may transmit uplink frame N 434a. The start of uplink frame N 434a is shown in FIG. 4.

The subscriber station 402 may then move from position Y 436 to position X 430, which is closer to the base station 404 than position Y 436. The subscriber station 402 is shown receiving the start of downlink frame N+n 432b, where n is any positive integer. The subscriber station 402 may record a time stamp 416b corresponding to the point in time when it received the start of downlink frame N+n 432b.

The subscriber station 402 may then determine the propagation delay change 428. The time stamps 416a-b may be used to determine the propagation delay change 428. For example, equation (1) above may be used to determine the propagation delay change 428. If equation (1) is used, $\Delta$ is negative, because the subscriber station 402 has moved closer to the base station 404. Because $\Delta$ is negative, the difference between the time stamps 416a-b may be given by n×D+A. Alternatively, the difference between the time stamps 416a-b may be given by n×D−|Δ|, as shown in FIG. 4. The expression n×D−|Δ| illustrates that the difference between the time stamps 416a-b is less than a multiple of the frame duration.

The subscriber station 402 may adjust the uplink transmission timing based on the propagation delay change 428 that is determined. Because in this example the subscriber station 402 has moved closer to the base station 404, the propagation delay change 428 has decreased. Thus, the transmission of the next uplink frame may be delayed by |Δ|, as shown. Therefore, the difference between the start of uplink frame N 434a and the start of uplink frame N+n 434b may be given by n×D+|Δ| as shown.

Figure 5:
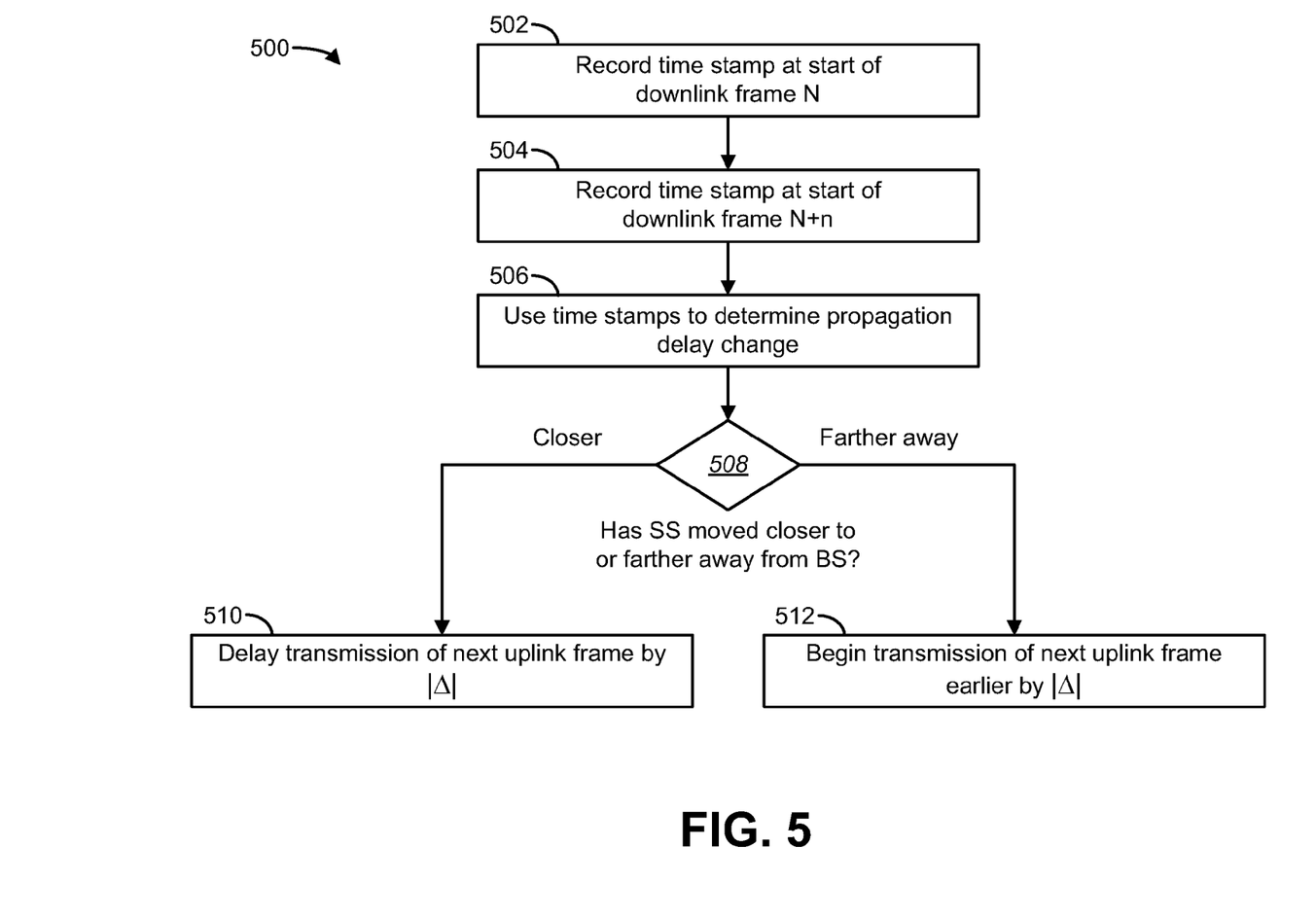
FIG. 5 illustrates a method for uplink frame synchronization.

FIG. 5 illustrates a method 500 for uplink frame synchronization. The method 500 may be implemented by a subscriber station 102.

Whenever data is received on the downlink 108, the subscriber station 102 may record the time stamp 116 corresponding to the start of the downlink frame. Thus, the subscriber station 102 may record 502 a time stamp 316a corresponding to the start of downlink frame N 332a. The subscriber station 102 may also record 504 a time stamp 316b corresponding to the start of downlink frame N+n 332b, where n is any positive integer.

The subscriber station 102 may then determine the propagation delay change 328. The time stamps 316a-b may be used to determine 506 the propagation delay change 328. The propagation delay change 328 may be determined 506 in accordance with equation (1) above.

The subscriber station 102 may adjust the uplink transmission timing based on the propagation delay change 328 that is determined. It may be determined 508 whether the subscriber station 102 has moved closer to or farther away from the base station 104. If the subscriber station 102 has moved closer to the base station 104, then the subscriber station 102 may delay 510 the transmission of the next uplink frame by |Δ|. If the subscriber station 102 has moved farther away from the base station 104, then the subscriber station 102 may begin 512 transmission of the next uplink frame earlier by |Δ|.

The subscriber station 102 may adjust the uplink transmission timing based on the propagation delay change 328 that is calculated from the difference between two time stamps 316a-b, as just described. Alternatively, to smooth out possible time stamp errors, the propagation delay change 328 may be averaged for a few consecutive frames before any timing adjustment is applied to the uplink transmission.

For example, the propagation delay change 328 between frame N and frame N+n may be determined. Then, the propagation delay change 328 between frame N and frame N+(n+1) may be determined. This may continue for several consecutive frames, until the propagation delay change 328 between frame N and frame N+(n+k) is determined. Then, the average propagation delay change determined at frame N+n through frame N+(n+k) may be calculated, and the uplink transmission timing may be adjusted based on this average propagation delay change.

Figure 6:
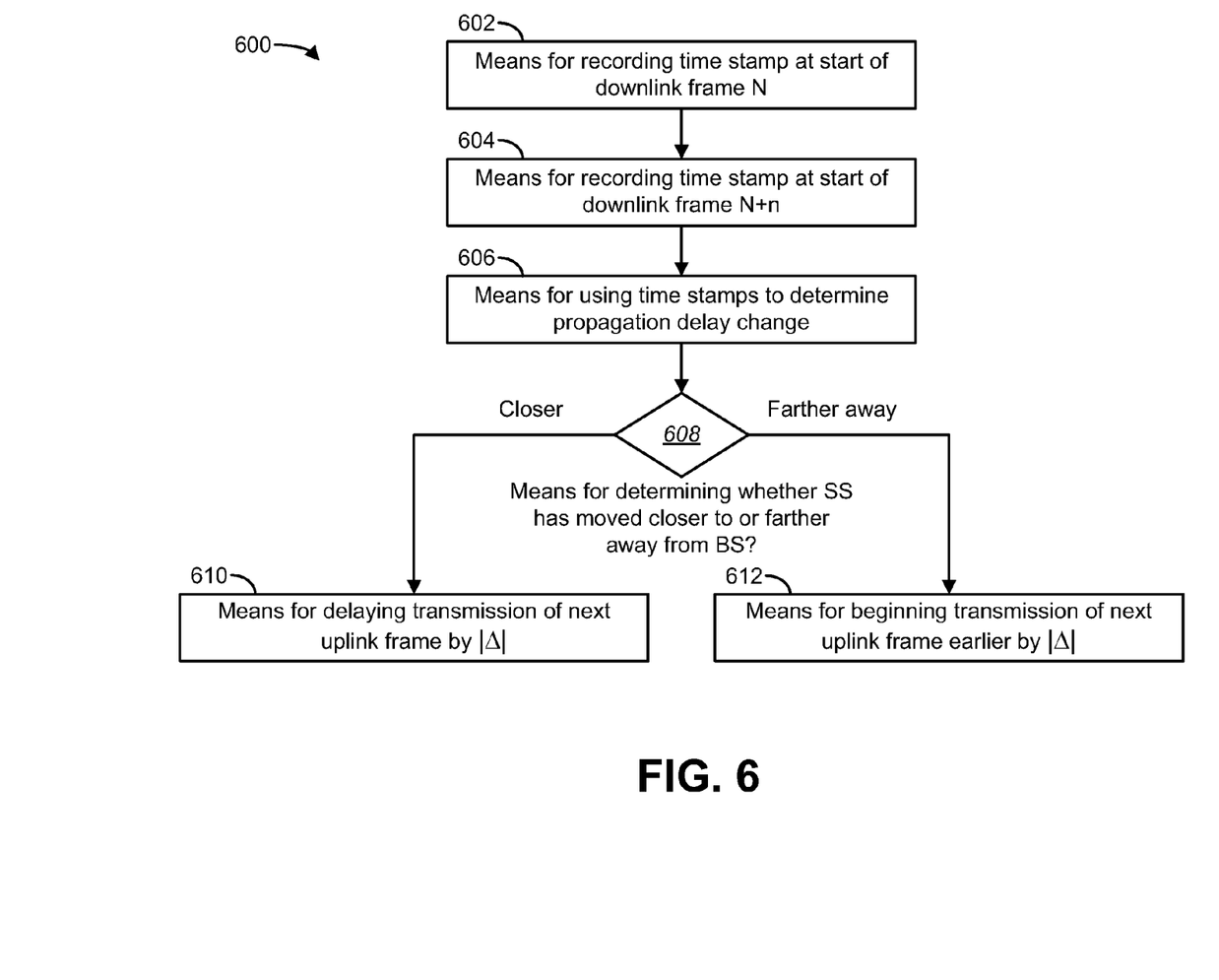
FIG. 6 illustrates means-plus-function blocks corresponding to the method of FIG. 5.

The method 500 of FIG. 5 described above may be performed by various hardware and/or software component(s) and/or module(s) corresponding to the means-plus-function blocks 600 illustrated in FIG. 6. In other words, blocks 502 through 512 illustrated in FIG. 5 correspond to means-plus-function blocks 602 through 612 illustrated in FIG. 6.

Figure 7:
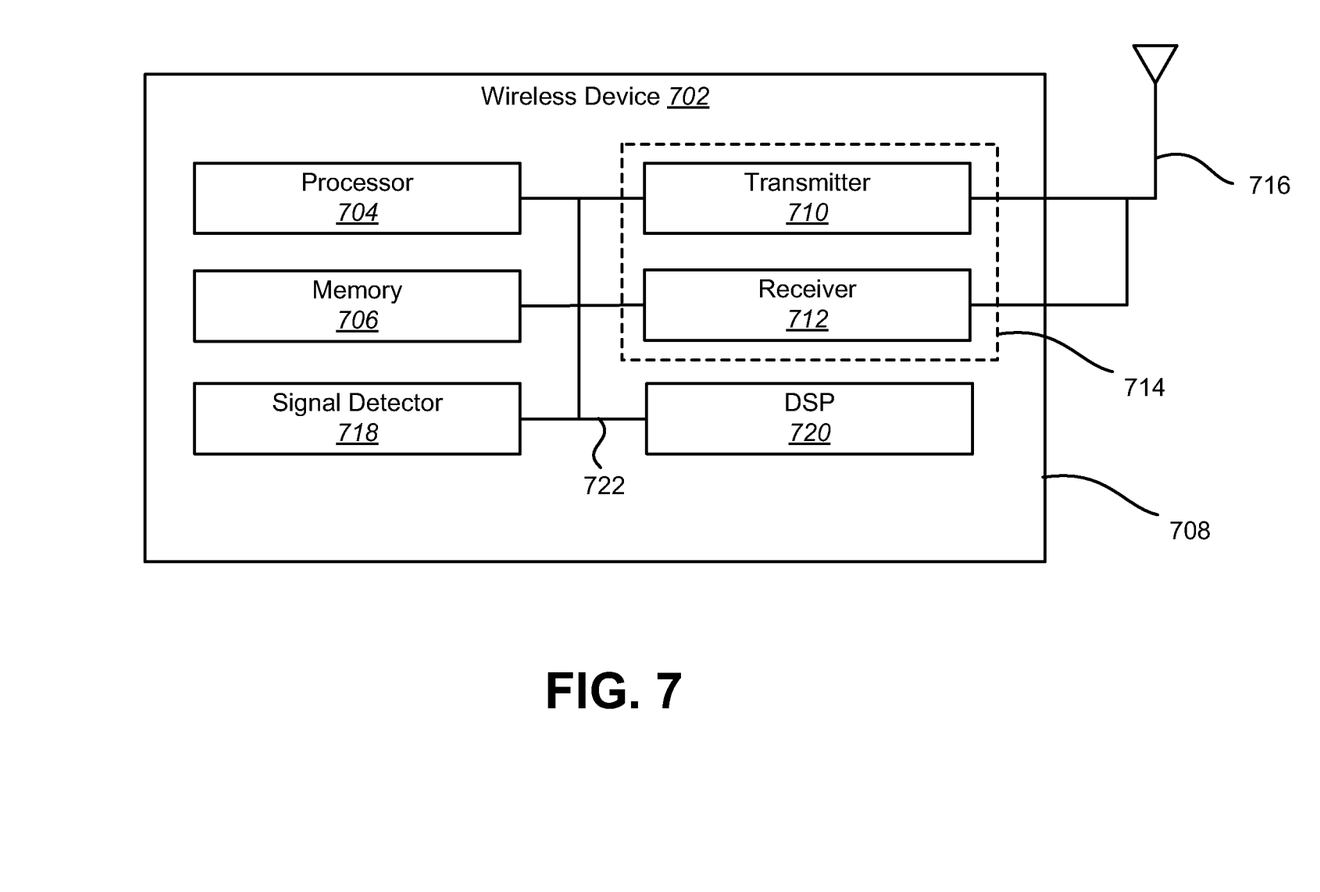
FIG. 7 illustrates various components that may be utilized in a wireless device.

FIG. 7 illustrates various components that may be utilized in a wireless device 702. The wireless device 702 is an example of a device that may be configured to implement the various methods described herein. The wireless device 702 may be a subscriber station 102 or a base station 104.

The wireless device 702 may include a processor 704 which controls operation of the wireless device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The wireless device 702 may also include a housing 708 that may include a transmitter 710 and a receiver 712 to allow transmission and reception of data between the wireless device 702 and a remote location. The transmitter 710 and receiver 712 may be combined into a transceiver 714. An antenna 716 may be attached to the housing 708 and electrically coupled to the transceiver 714. The wireless device 702 may also include (not shown) multiple transmitters, multiple receivers, multiple transceivers and/or multiple antenna.

The wireless device 702 may also include a signal detector 718 that may be used to detect and quantify the level of signals received by the transceiver 714. The signal detector 718 may detect such signals as total energy, power spectral density, and other signals. The wireless device 702 may also include a digital signal processor (DSP) 720 for use in processing signals.

The various components of the wireless device 702 may be coupled together by a bus system 722 which may include a power bus, a control signal bus, and a status signal bus in addition to a data bus. However, for the sake of clarity, the various buses are illustrated in FIG. 7 as the bus system 722.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, components, modules and circuits described in connection with the present disclosure may be implemented wholly or partially as instructions stored in memory that are executed by a processor. The processor may be a general purpose processor, a digital signal processor (DSP), etc. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

Alternatively, or in addition, the various illustrative logical blocks, components, modules and circuits described in connection with the present disclosure may be implemented wholly or partially in hardware. As used herein, the term "hardware" should be construed broadly to include an application specific integrated circuit (ASIC), a field programmable gate array signal (FPGA) or other programmable logic device, discrete gate or transistor logic, discrete hardware components or any combination thereof designed to perform the functions described herein.

A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 5 and 6, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for uplink frame synchronization, the method being implemented by a subscriber station, the method comprising:
    recording a first time stamp corresponding to a first downlink frame received from a base station;
    recording a second time stamp corresponding to a second downlink frame received from the base station, wherein the subscriber station moves closer to the base station between the first downlink frame and the second downlink frame;
    using the first time stamp and the second time stamp to determine a propagation delay change; and
    adjusting uplink transmission timing based on the propagation delay change by delaying transmission of an uplink frame.

2. The method of claim 1, wherein a time difference between the start of the delayed uplink frame and the start of a previous uplink frame is given by $n \times D + |\Delta|$, wherein $\Delta$ is the propagation delay change, wherein $D$ is the duration of a single frame, and wherein $n$ is a positive integer.

3. A method for uplink frame synchronization, the method being implemented by a subscriber station, the method comprising:
    recording a first time stamp corresponding to a first downlink frame received from a base station;
    recording a second time stamp corresponding to a second downlink frame received from the base station, wherein the subscriber station moves farther away from the base station between the first downlink frame and the second downlink frame;
    using the first time stamp and the second time stamp to determine a propagation delay change; and
    adjusting uplink transmission timing based on the propagation delay change by beginning transmission of an uplink frame earlier than was previously scheduled.

4. The method of claim 3, wherein the difference between the start of the early uplink frame and the start of a previous uplink frame is given by $n \times D - |\Delta|$, wherein $\Delta$ is the propagation delay change, wherein $D$ is the duration of a single frame, and wherein $n$ is a positive integer.

5. A method for uplink frame synchronization, the method being implemented by a subscriber station, the method comprising:
    recording a first time stamp corresponding to a first downlink frame received from a base station;
    recording a second time stamp corresponding to a second downlink frame received from the base station;

using the first time stamp and the second time stamp to determine a propagation delay change, wherein the propagation delay change is determined as $\Delta=T-n*D$, wherein D is the duration of a single frame, wherein n is a positive integer, and wherein T is the difference between the second time stamp and the first time stamp; and adjusting uplink transmission timing based on the propagation delay change.

6. The method of claim 5, wherein the first time stamp and the second time stamp are determined by a time stamp generator.

7. The method of claim 6, wherein the time stamp generator is a global positioning system (GPS) receiver.

8. The method of claim 5, wherein the subscriber station is configured to communicate via a wireless communication network that supports an Institute of Electronic and Electrical Engineers (IEEE) 802.16 standard.

9. A subscriber station that performs uplink frame synchronization, comprising:

a downlink timing monitor that records a first time stamp corresponding to a first downlink frame received from a base station and a second time stamp corresponding to a second downlink frame received from the base station, wherein the subscriber station moves closer to the base station between the first downlink frame and the second downlink frame;

a timing change calculator that uses the first time stamp and the second time stamp to determine a propagation delay change; and an uplink frame synchronizer that adjusts uplink transmission timing based on the propagation delay change by delaying transmission of an uplink frame.

10. The subscriber station of claim 9, wherein a time difference between the start of the delayed uplink frame and the start of a previous uplink frame is given by $n \times D + |\Delta|$, wherein $\Delta$ is the propagation delay change, wherein D is the duration of a single frame, and wherein n is a positive integer.

11. A subscriber station that performs uplink frame synchronization, comprising:

a downlink timing monitor that records a first time stamp corresponding to a first downlink frame received from a base station and a second time stamp corresponding to a second downlink frame received from the base station, wherein the subscriber station moves farther away from the base station between the first downlink frame and the second downlink frame;

a timing change calculator that uses the first time stamp and the second time stamp to determine a propagation delay change; and an uplink frame synchronizer that adjusts uplink transmission timing based on the propagation delay change by beginning transmission of an uplink frame earlier than was previously scheduled.

12. The subscriber station of claim 11, wherein the difference between the start of the early uplink frame and the start of a previous uplink frame is given by $n \times D - |\Delta|$, wherein $\Delta$ is the propagation delay change, wherein D is the duration of a single frame, and wherein n is a positive integer.

13. A subscriber station that performs uplink frame synchronization, comprising:

a downlink timing monitor that records a first time stamp corresponding to a first downlink frame received from a base station and a second time stamp corresponding to a second downlink frame received from the base station;

a timing change calculator that uses the first time stamp and the second time stamp to determine a propagation delay change, wherein the propagation delay change is determined as $\Delta=T-n*D$, wherein D is the duration of a single frame, wherein n is a positive integer, and wherein T is the difference between the second time stamp and the first time stamp; and an uplink frame synchronizer that adjusts uplink transmission timing based on the propagation delay change.

14. The subscriber station of claim 13, further comprising a time stamp generator that determines the first time stamp and the second time stamp.

15. The subscriber station of claim 14, wherein the time stamp generator is a global positioning system (GPS) receiver.

16. The subscriber station of claim 13, wherein the downlink timing monitor, the timing change calculator, and the uplink frame synchronizer are implemented as instructions stored in memory that are executed by a processor.

17. The subscriber station of claim 13, wherein the downlink timing monitor, the timing change calculator, and the uplink frame synchronizer are implemented in hardware.

18. The subscriber station of claim 13, wherein the downlink timing monitor, the timing change calculator, and the uplink frame synchronizer are implemented in an integrated circuit.

19. The subscriber station of claim 13, wherein the subscriber station is configured to communicate via a wireless communication network that supports an Institute of Electronic and Electrical Engineers (IEEE) 802.16 standard.

20. A subscriber station that performs uplink frame synchronization, comprising:

means for recording a first time stamp corresponding to a first downlink frame received from a base station;

means for recording a second time stamp corresponding to a second downlink frame received from the base station, wherein the subscriber station moves closer to the base station between the first downlink frame and the second downlink frame;

means for using the first time stamp and the second time stamp to determine a propagation delay change; and means for adjusting uplink transmission timing based on the propagation delay change by delaying transmission of an uplink frame.

21. The subscriber station of claim 20, wherein a time difference between the start of the delayed uplink frame and the start of a previous uplink frame is given by $n \times D + |\Delta|$, wherein $\Delta$ is the propagation delay change, wherein D is the duration of a single frame, and wherein n is a positive integer.

22. A subscriber station that performs uplink frame synchronization, comprising:

means for recording a first time stamp corresponding to a first downlink frame received from a base station;

means for recording a second time stamp corresponding to a second downlink frame received from the base station, wherein the subscriber station moves farther away from the base station between the first downlink frame and the second downlink frame;

means for using the first time stamp and the second time stamp to determine a propagation delay change; and means for adjusting uplink transmission timing based on the propagation delay change by beginning transmission of an uplink frame earlier than was previously scheduled.

23. The subscriber station of claim 22, wherein the difference between the start of the early uplink frame and the start of a previous uplink frame is given by $n \times D - |\Delta|$, wherein $\Delta$ is the propagation delay change, wherein D is the duration of a single frame, and wherein n is a positive integer.

24. A subscriber station that performs uplink frame synchronization, comprising:
  means for recording a first time stamp corresponding to a first downlink frame received from a base station;
  means for recording a second time stamp corresponding to a second downlink frame received from the base station;
  means for using the first time stamp and the second time stamp to determine a propagation delay change, wherein the propagation delay change is determined as $\Delta=T-n*D$, wherein D is the duration of a single frame, wherein n is a positive integer, and wherein T is the difference between the second time stamp and the first time stamp; and
  means for adjusting uplink transmission timing based on the propagation delay change.

25. The subscriber station of claim 24, further comprising a time stamp generator that determines the first time stamp and the second time stamp.

26. The subscriber station of claim 25, wherein the time stamp generator is a global positioning system (GPS) receiver.

27. The subscriber station of claim 24, wherein the subscriber station is configured to communicate via a wireless communication network that supports an Institute of Electronic and Electrical Engineers (IEEE) 802.16 standard.

28. A computer-program product for uplink frame synchronization performed by a subscriber station, the computer-program product comprising a non-transitory computer readable medium having instructions thereon, the instructions comprising:
  code for recording a first time stamp corresponding to a first downlink frame received from a base station;
  code for recording a second time stamp corresponding to a second downlink frame received from the base station, wherein the subscriber station moves closer to the base station between the first downlink frame and the second downlink frame;
  code for using the first time stamp and the second time stamp to determine a propagation delay change; and
  code for adjusting uplink transmission timing based on the propagation delay change by delaying transmission of an uplink frame.

29. The computer-program product of claim 28, wherein a time difference between the start of the delayed uplink frame and the start of a previous uplink frame is given by $n \times D + |\Delta|$, wherein $\Delta$ is the propagation delay change, wherein D is the duration of a single frame, and wherein n is a positive integer.

30. A computer-program product for uplink frame synchronization performed by a subscriber station, the computer-program product comprising a non-transitory computer readable medium having instructions thereon, the instructions comprising:
  code for recording a first time stamp corresponding to a first downlink frame received from a base station;
  code for recording a second time stamp corresponding to a second downlink frame received from the base station, wherein the subscriber station moves farther away from the base station between the first downlink frame and the second downlink frame;
  code for using the first time stamp and the second time stamp to determine a propagation delay change; and
  code for adjusting uplink transmission timing based on the propagation delay change by beginning transmission of an uplink frame earlier than was previously scheduled.

31. The computer-program product of claim 30, wherein the difference between the start of the early uplink frame and the start of a previous uplink frame is given by $n \times D - |\Delta|$, wherein $\Delta$ is the propagation delay change, wherein D is the duration of a single frame, and wherein n is a positive integer.

32. A computer-program product for uplink frame synchronization performed by a subscriber station, the computer-program product comprising a non-transitory computer readable medium having instructions thereon, the instructions comprising:
  code for recording a first time stamp corresponding to a first downlink frame received from a base station;
  code for recording a second time stamp corresponding to a second downlink frame received from the base station;
  code for using the first time stamp and the second time stamp to determine a propagation delay change, wherein the propagation delay change is determined as $\Delta=T-n*D$, wherein D is the duration of a single frame, wherein n is a positive integer, and wherein T is the difference between the second time stamp and the first time stamp; and
  code for adjusting uplink transmission timing based on the propagation delay change.

33. The computer-program product of claim 32, wherein the first time stamp and the second time stamp are determined by a time stamp generator.

34. The computer-program product of claim 33, wherein the time stamp generator is a global positioning system (GPS) receiver.

35. The computer-program product of claim 32, wherein the subscriber station is configured to communicate via a wireless communication network that supports an Institute of Electronic and Electrical Engineers (IEEE) 802.16 standard.

* * * * *